(12) United States Patent
Takahashi et al.

(10) Patent No.: US 11,966,083 B2
(45) Date of Patent: Apr. 23, 2024

(54) COMMUNICATION DEVICE AND COMMUNICATION SYSTEM

(71) Applicant: KDDI CORPORATION, Tokyo (JP)

(72) Inventors: Hidenori Takahashi, Fujimino (JP); Daiki Soma, Fujimino (JP); Shohei Beppu, Fujimino (JP); Takehiro Tsuritani, Fujimino (JP); Noboru Yoshikane, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 48 days.

(21) Appl. No.: 17/588,591

(22) Filed: Jan. 31, 2022

(65) Prior Publication Data

US 2022/0187541 A1 Jun. 16, 2022

Related U.S. Application Data

(63) Continuation of application No. PCT/JP2020/031972, filed on Aug. 25, 2020.

(30) Foreign Application Priority Data

Sep. 2, 2019 (JP) .................................. 2019-159693

(51) Int. Cl.
*H04B 10/03* (2013.01)
*G02B 6/35* (2006.01)
(Continued)

(52) U.S. Cl.
CPC ............. *G02B 6/35* (2013.01); *G02B 6/3895* (2013.01); *H04B 10/03* (2013.01); *H04B 10/2581* (2013.01); *H04B 10/2587* (2013.01)

(58) Field of Classification Search
CPC .... H04B 10/40; H04B 10/03; H04B 10/2581; H04B 10/2587; G02B 6/3885;
(Continued)

(56) References Cited

U.S. PATENT DOCUMENTS 4,910,727 A * 3/1990 Fussganger ............ H04B 10/40
398/139
2003/0081285 A1 5/2003 Shimojoh
(Continued)

FOREIGN PATENT DOCUMENTS

JP 2003-134089 A 5/2003
JP 2005-051750 A 2/2005
(Continued)

OTHER PUBLICATIONS

Extended European Search Report issued in corresponding European Patent Application No. 20861721.7, dated Oct. 5, 2022 (11 pages).

*Primary Examiner* — Leslie C Pascal
(74) *Attorney, Agent, or Firm* — Foley & Lardner LLP (57) ABSTRACT

A communication device includes: a switching unit connected to a transmission unit, a reception unit, a transmission port, and a reception port, the switching unit being set in a first state in which the transmission unit and the transmission port are connected and the reception unit and the reception port are connected or a second state in which the transmission unit and the reception port are connected and the reception unit and the transmission port are connected; a monitoring unit configured to monitor a light level of light input from the reception port or the transmission port; and a control unit configured to set the switching unit in the first state or the second state based on the light level monitored by the monitoring unit.

1 Claim, 6 Drawing Sheets (51) Int. Cl.
*G02B 6/38* (2006.01)
*H04B 10/2581* (2013.01)
*H04B 10/2587* (2013.01)

(58) Field of Classification Search
CPC .... G02B 6/02042; G02B 6/35; G02B 6/4292; G02B 6/3598; G02B 6/3895; G02B 6/4246
See application file for complete search history.

(56) References Cited

U.S. PATENT DOCUMENTS

| | | | |
|---|---|---|---|
| 2013/0094857 A1* | 4/2013 | Hinderthur | H04Q 11/0067 398/58 |
| 2016/0161673 A1* | 6/2016 | Hamaguchi | G02B 6/2553 65/378 |
| 2016/0223774 A1* | 8/2016 | Bennett | G02B 6/4482 |

FOREIGN PATENT DOCUMENTS

| | | |
|---|---|---|
| JP | 2012-022176 A | 2/2012 |
| JP | 6787803 B2 * | 11/2020 |
| WO | WO-2015/025629 A1 | 2/2015 |
| WO | WO-2022176978 A1 * | 8/2022 |

* cited by examiner

COMMUNICATION DEVICE AND COMMUNICATION SYSTEM

CROSS-REFERENCE TO RELATED APPLICATION(S)

This application is a continuation of International Patent Application No. PCT/JP2020/031972 filed on Aug. 25, 2020, which claims priority to and the benefit of Japanese Patent Application No. 2019-159693 filed on Sep. 2, 2019, the entire disclosures of which are incorporated herein by reference.

BACKGROUND OF THE INVENTION

Field of the Invention

The present invention relates to a technique for solving an erroneous connection in a communication system.

Description of the Related Art

In order to increase communication capacity, a multicore (MC) optical fiber in which a plurality of cores are provided in an optical fiber is used. Patent Literature 1 discloses a multicore interface (MCI) that is a connection member used to connect single core (SC) optical fibers to an MC optical fiber.

PTL1: Japanese Patent Laid-Open No. 2012-22176

Figure 1A:
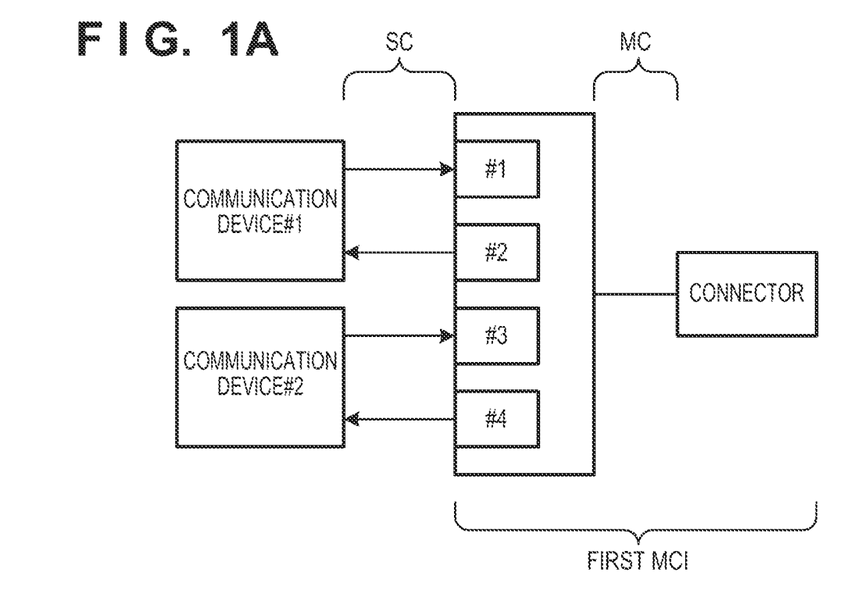
FIG. 1A is a diagram illustrating problems encountered with conventional technology.
Figure 1B:
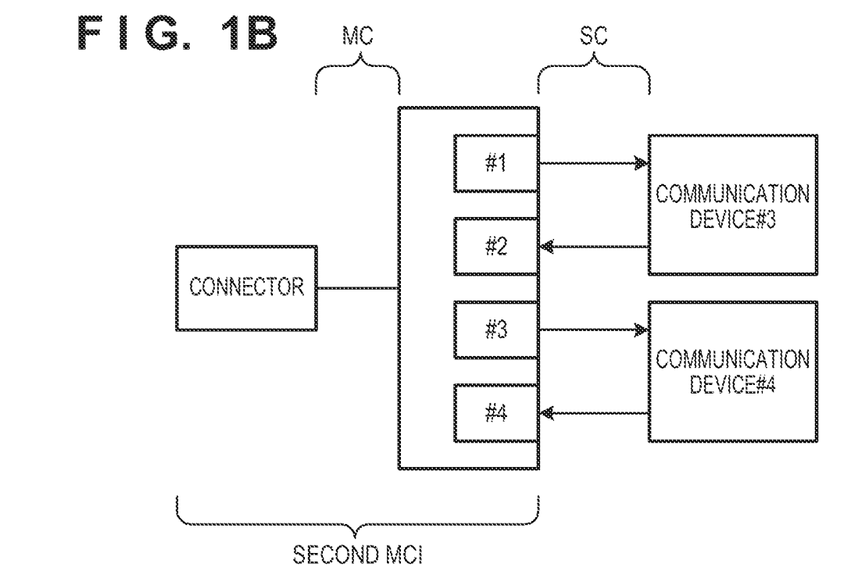
FIG. 1B is a diagram illustrating problems encountered with conventional technology.

In an optical communication system, two types of MCI are used. In the description given below, one type of MCI will be referred to as "first MCI", and the other type of MCI will be referred to as "second MCI". FIGS. 1A and 1B show an optical communication system in which MC optical fibers are used. FIGS. 1A and 1B each show a configuration in a communication station building. The communication station building shown in FIG. 1A and the communication station building shown in FIG. 1B are connected using an optical transmission line that uses MC optical fibers, each including four cores. It is assumed here that communication device #1 shown in FIG. 1A and communication device #3 shown in FIG. 1B oppose each other, and communication device #2 shown in FIG. 1A and communication device #4 shown in FIG. 1B oppose each other. A first MCI is used to connect SC optical fibers that are respectively connected to communication device #1 and communication device #2 to an MC optical fiber of an optical transmission line. A second MCI is used to connect SC optical fibers that are respectively connected to communication device #3 and communication device #4 to an MC optical fiber of an optical transmission line.

Specifically, a transmission port of communication device #1 is connected to port #1 of the first MCI using an SC optical fiber. A reception port of communication device #1 is connected to port #2 of the first MCI using an SC optical fiber. A transmission port of communication device #2 is connected to port #3 of the first MCI using an SC optical fiber. A reception port of communication device #2 is connected to port #4 of the first MCI using an SC optical fiber. The first MCI connects ports #1 to 4 to cores #1 to #4 that are included in the MC optical fiber. By connecting a connector included in the first MCI to the optical transmission line, cores #1 to #4 of the MC optical fiber of the first MCI are connected to cores #1 to #4 that are included in the optical transmission line.

Also, a reception port of communication device #3 is connected to port #1 of the second MCI using an SC optical fiber. A transmission port of communication device #3 is connected to port #2 of the second MCI using an SC optical fiber. A reception port of communication device #4 is connected to port #3 of the second MCI using an SC optical fiber. A transmission port of communication device #4 is connected to port #4 of the second MCI using an SC optical fiber. The second MCI connects ports #1 to #4 to cores #1 to 4 of the MC optical fiber. By connecting a connector included in the second MCI to the optical transmission line, cores #1 to #4 that are included in the MC optical fiber of the second MCI are connected to cores #1 to #4 of the optical transmission line.

Figure 2A:
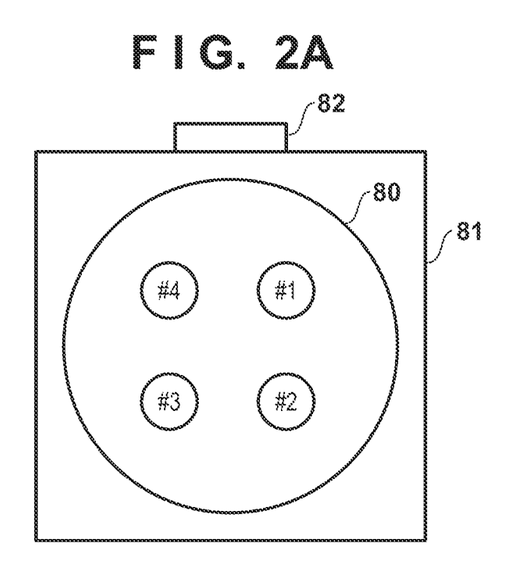
FIG. 2A is a diagram illustrating problems encountered with conventional technology.
Figure 2B:
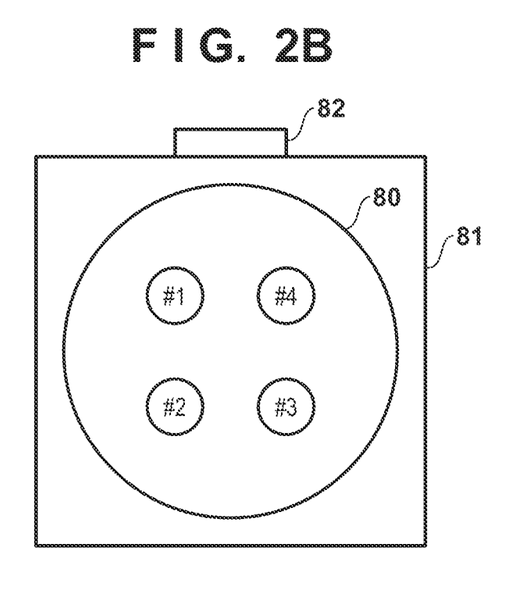
FIG. 2B is a diagram illustrating problems encountered with conventional technology.

FIGS. 2A and 2B show cross sections of the connector of the first MCI and the connector of the second MCI, respectively. Reference numeral 80 indicates an MC optical fiber, reference numeral 81 indicates a connector main body, and reference numeral 82 indicates a locking mechanism that is attached to the connector. Also, in FIGS. 2A and 2B, circles numbered from #1 to #4 represent cores #1 to #4 of the MC optical fiber. As shown in FIGS. 2A and 2B, the cross section of the connector of the first MCI and the cross section of the connector of the second MCI are mirror symmetric. This is because communication device #1 and communication device #2, and communication device #3 and communication device #4 are connected to different end portions of the optical transmission line.

Here, a case will be considered where, instead of the second MCI, the first MCI is mistakenly used to connect communication device #3 and communication device #4 to the optical transmission line. In this case, core #1 of the optical transmission line is connected to core #4 of the mistakenly used first MCI, core #2 of the optical transmission line is connected to core #3 of the mistakenly used first MCI, core #3 of the optical transmission line is connected to core #2 of the mistakenly used first MCI, and core #4 of the optical transmission line is connected to core #1 of the mistakenly used first MCI. Accordingly, the transmission port of communication device #1 is connected to the transmission port of communication device #4, the reception port of communication device #1 is connected to the reception port of communication device #4, the transmission port of communication device #2 is connected to the transmission port of communication device #3, and the reception port of communication device #2 is connected to the reception port of communication device #2. The same happens in the case where, instead of the first MCI, the second MCI is mistakenly used to connect communication device #1 and communication device #2 to the optical transmission line.

In an optical transmission line, an MCI is used not only in a connection portion between the optical transmission line and a communication device, but also a first MCI and a second MCI are used to connect a connection portion between optical transmission lines because it is necessary to connect SC optical fibers to an MC optical fiber. For example, by connecting port #3 and port #4 of the first MCI shown in FIG. 1A to another optical transmission line, and connecting port #3 and port #4 of the second MCI shown in FIG. 1B to another optical transmission line, communication device #2 can be provided at a location different from the location where communication device #1 is provided, and communication device #4 can be provided at a location different from the location where communication device #3 is provided.

Accordingly, in a plurality of MCIs used in an optical communication system, if a wrong type of MCI is used, and a communication device is connected to another communication device that does not oppose the communication device, it is difficult to identify the wrong type of MCI or determine to which communication device the communication device is mistakenly connected. In particular, the level of difficulty increases in a situation where the number of cores included in an MC optical fiber increases, and communication devices that use the same optical transmission line are provided at various locations.

SUMMARY OF THE INVENTION

According to an aspect of the present disclosure, a communication device includes: a transmission unit configured to transmit an optical signal; a reception unit configured to receive an optical signal; a transmission port; a reception port; a switching unit connected to the transmission unit, the reception unit, the transmission port, and the reception port, the switching unit being set in a first state in which the transmission unit and the transmission port are connected and the reception unit and the reception port are connected or a second state in which the transmission unit and the reception unit are connected and the reception unit and the transmission port are connected; a monitoring unit configured to monitor a light level of light input from the reception port or the transmission port; and a control unit configured to set the switching unit in the first state or the second state based on the light level monitored by the monitoring unit.

According to the present invention, even if an erroneous connection occurs in a communication system, it is possible to easily solve the erroneous connection.

Other features and advantages of the present invention will be apparent from the following description taken in conjunction with the accompanying drawings. Note that the same reference numerals denote the same or like components throughout the accompanying drawings.

DESCRIPTION OF THE EMBODIMENTS

Hereinafter, embodiments will be described in detail with reference to the accompanying drawings. It is to be noted that, the embodiments given below are not intended to limit the scope of the invention recited in the appended claims, and not all combinations of features described in the embodiments are necessarily required to carry out the invention. Two or more features of a plurality of features described in the embodiments may be combined in any way. Also, structural elements that are the same or similar are given the same reference numerals, and a redundant description will be omitted.

First Embodiment

Ordinarily, in an MC optical fiber, as shown in FIGS. 2A and 2B, a plurality of cores are arranged along the circumferential direction, and core numbers are assigned to the plurality of cores along the circumferential direction. Also, ordinarily, cores to which successive core numbers are assigned are used as the cores used to perform transmission and reception between two communication devices that oppose each other. However, as described with reference to FIGS. 1A and 1B and FIGS. 2A and 2B, if a wrong type of MCI is used, a communication device may be connected to another communication device that is different from a communication device that opposes the communication device. For this reason, in the present embodiment, as two cores used to perform transmission and reception between two communication devices that oppose each other, two cores that are line symmetric with respect to a line extending in a predetermined direction in a cross section of an MC optical fiber are used. The line extending in a predetermined direction is determined according to the position of the locking mechanism attached to the connector used in the MCI.

Figure 3A:
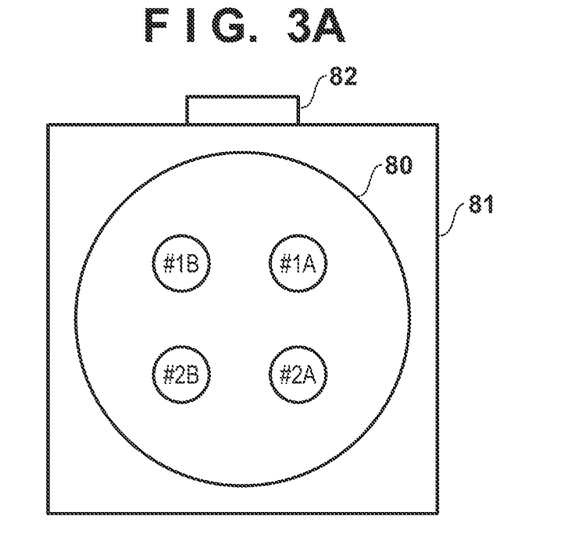
FIG. 3A is a cross-sectional view of a connector included in a first MCI according to an embodiment.
Figure 3B:
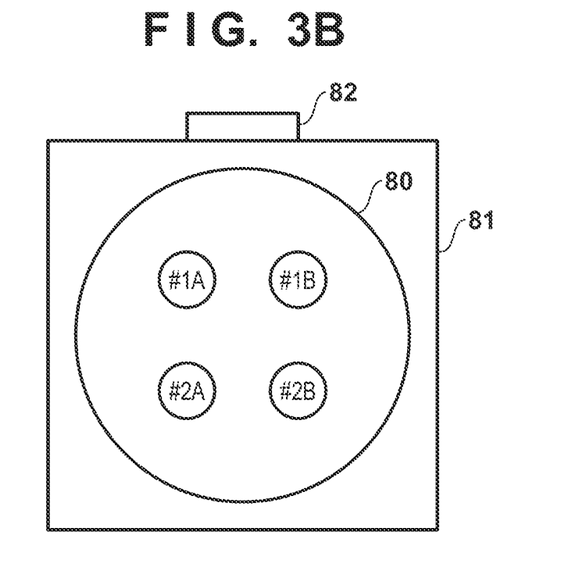
FIG. 3B is a cross-sectional view of a connector included in a second MCI according to the embodiment.

FIGS. 3A and 3B are diagrams illustrating two cores used to perform transmission and reception between two communication devices that oppose each other. FIGS. 3A and 3B show cross sections of a connector of a first MCI and a connector of a second MCI, respectively. The cross sections of the MC optical fibers shown in FIGS. 3A and 3B also correspond to cross sections each taken along a plane orthogonal to the lengthwise direction of the MC optical fiber 80. The line extending in a predetermined direction is a vertical line extending through the center of the MC optical fiber when the locking mechanism is provided on the upper side or the lower side in the vertical direction. Then, cores #1A and #1B, and cores #2A and #2B that are provided at positions symmetric with respect to the vertical line are defined as the cores used to perform transmission and reception between two communication devices that oppose each other.

Figure 4A:
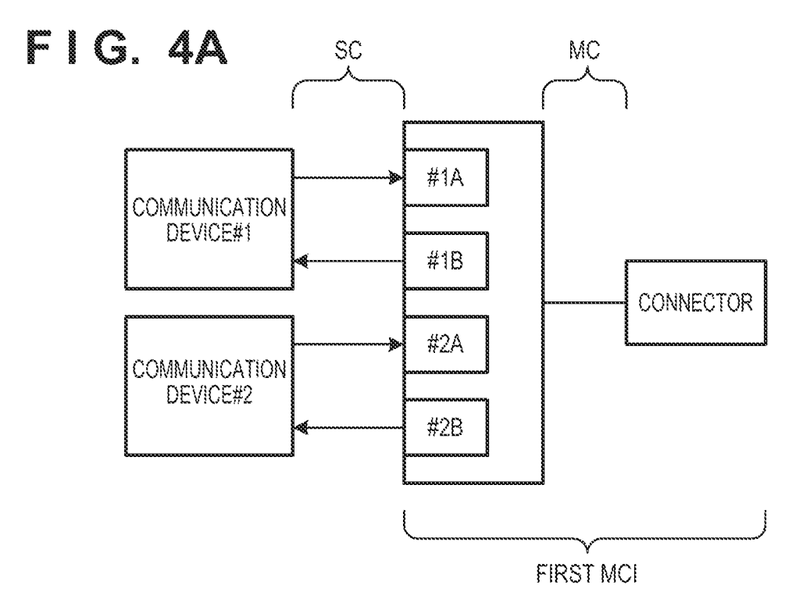
FIG. 4A is a configuration diagram of an optical communication system according to an embodiment.
Figure 4B:
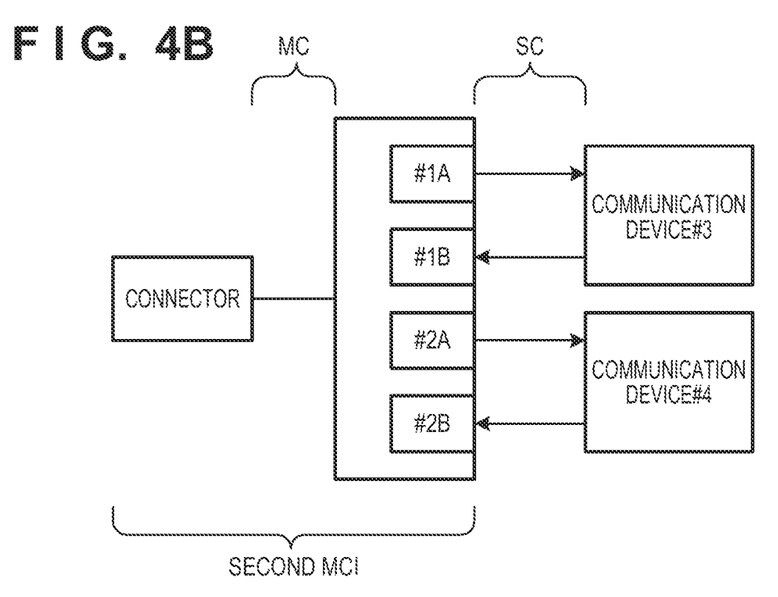
FIG. 4B is a configuration diagram of the optical communication system according to the embodiment.

FIGS. 4A and 4B are configuration diagrams of an optical communication system in which two cores used to perform transmission and reception between two communication devices that oppose each other have been determined in the manner described above. Communication device #1 shown in FIG. 4A and communication device #3 shown in FIG. 4B are two communication devices that oppose each other, and communication device #2 shown in FIG. 4A and communication device #4 shown in FIG. 4B are two communication devices that oppose each other.

A transmission port of communication device #1 is connected to port #1A of the first MCI using an SC optical fiber. A reception port of communication device #1 is connected to port #1B of the first MCI using an SC optical fiber. A transmission port of communication device #2 is connected to port #2A of the first MCI using an SC optical fiber. A reception port of communication device #2 is connected to port #2B of the first MCI using an SC optical fiber. The first MCI connects ports #1A, #1B, #2A, and #2B to cores #1A,

1B, #2A, and #2B of the MC optical fiber. By connecting the connector of the first MCI to the optical transmission line, cores #1A, #1B, #2A, and #2B of the MC optical fiber of the first MCI are connected to cores #1A, #1B. #2A, and #2B of the optical transmission line.

Also, a reception port of communication device #3 is connected to port #1A of the second MCI using an SC optical fiber. A transmission port of communication device #3 is connected to port #1B of the second MCI using an SC optical fiber. A reception port of communication device #4 is connected to port #2A of the second MCI using an SC optical fiber. A transmission port of communication device #4 is connected to port #2B of the second MCI using an SC optical fiber. The second MCI connects ports #1A, #1B, #2A, and #2B to cores #1A, #1B, #2A, and #2B of the multicore (MC) optical fiber. By connecting the connector of the second MCI to the optical transmission line, cores #1A, #1B, #2A, and #2B of the MC optical fiber of the second MCI are connected to cores #1A, #1B, #2A, and #2B of the optical transmission line.

Here, a case will be considered where, instead of the second MCI, the first MCI is mistakenly used to connect communication devices #3 and #4 to the optical transmission line. In this case, core #1A of the optical transmission line is connected to core #1B of the mistakenly used first MCI, core #1B of the optical transmission line is connected to core #1A of the mistakenly used first MCI, core #2A of the optical transmission line is connected to core #2B of the mistakenly used first MCI, and core #2B of the optical transmission line is connected to core #2A of the mistakenly used first MCI. Accordingly, the transmission port of communication device #1 is connected to the transmission port of communication device #3, the reception port of communication device #1 is connected to the reception port of communication device #3, the transmission port of communication device #2 is connected to the transmission port of communication device #4, and the reception port of communication device #2 is connected to the reception port of communication device #4.

However, unlike the case described with reference to FIGS. 1A and 1B and FIGS. 2A and 2B, even if a wrong type of MCI is used, the transmission ports of two communication devices that oppose each other are connected, and the reception ports of the two communication devices that oppose each other are connected. Accordingly, a situation does not occur in which a communication device is connected to another unrelated communication device. This does not depend on the number of wrong types of MCIs used or the locations at which the MCIs are provided. Accordingly, even if an erroneous connection occurs, by changing the connection relationship of an SC optical fiber that connects communication device #3 and the mistakenly used first MCI, the erroneous connection can be solved. Specifically, it is sufficient that the transmission port of communication device #3 is connected to port #1A of the mistakenly used first MCI, and the reception port of communication device #3 is connected to port #1B of the mistakenly used first MCI. The connection between communication device #1 and the first MCI that is the correct type of MCI using an SC optical fiber may also be changed.

Figure 5:
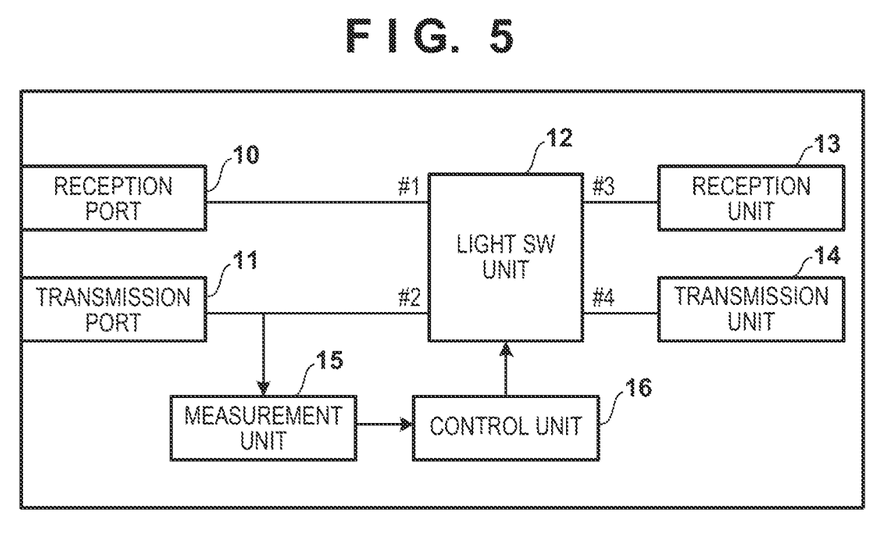
FIG. 5 is a configuration diagram of a communication device according to an embodiment.

Furthermore, the connection between a communication device and an MCI using an SC optical fiber may be changed by the communication device instead of the operator. FIG. 5 is configuration diagram of a communication device that includes a recovery mechanism for recovering from an erroneous connection. In FIG. 5, a transmission unit 14 generates and transmits an optical signal for transmitting information, and a reception unit 13 receives an optical signal generated by a transmission unit 14 that is included in an opposing communication device, and demodulates or decodes the optical signal. A reception port 10, a transmission port 11, the reception unit 13, and the transmission unit 14 included in the communication device are connected to ports #1, #2, #3, and #4 of a light switching (SW) unit 12, respectively.

The light SW unit 12 is set in a first state or a second state by being controlled by a control unit 16. In the first state, the light SW unit 12 connects port #1 and port #3, and connects port #2 and port #4. On the other hand, in the second state, the light SW unit 12 connects port #1 and port #4, and connects port #2 and port #3. A measurement unit 15 measures the level of light that propagates through the optical fiber between the light SW unit 12 and the transmission port 11, and notifies the control unit 16 of the measured level. It is assumed that the communication device is capable of performing communication with a management device (not shown) via a network, and the operator can remotely control the communication device via the management device.

When connecting two communication devices #1 and #3 that oppose each other using an optical transmission line, the operator sets the two communication devices #1 and #3 that oppose each other in an erroneous connection detection mode. In the erroneous connection detection mode, the control unit 16 of each communication device sets the light SW unit 12 in a predetermined state such as, for example, the first state. Then, the operator causes the transmission unit 14 of one of the two communication devices that oppose each other to transmit an optical signal, and causes the measurement unit 15 of the other communication device to measure the light level. At this time, the operator causes the transmission unit 14 of the other communication device to stop transmitting an optical signal. In the case where the transmission port 11 and the reception port 10 of the two communication devices that oppose each other are correctly connected, the light level detected by the measurement unit 15 of the other optical communication device is smaller than a predetermined value. When the control unit 16 receives a measurement result indicating that the light level detected by the measurement unit 15 in the erroneous connection detection mode is smaller than a predetermined value, the control unit 16 transmits, to the operator, a notification indicating that there is no erroneous connection, without changing the state of the light SW unit 12. On the other hand, in the case where the transmission ports 11 of the two communication devices that oppose each other are connected to each other, and the reception ports 10 of the two communication devices that oppose each other are connected to each other, the light level detected by the measurement unit 15 of the other optical communication device is greater than or equal to the predetermined value. When the control unit 16 receives a measurement result indicating that the light level detected by the measurement unit 15 in the erroneous connection detection mode is greater than or equal to the predetermined value, the control unit 16 changes the state of the light SW unit 12 to solve the erroneous connection, and transmits, to the operator, a notification indicating that an erroneous connection has occurred.

In FIG. 5, the measurement unit 15 detects the light level between the transmission port 11 and the light SW unit 12. However, the measurement unit 15 may be configured to detect a light level between the transmission unit 14 and the light SW unit 12. Alternatively, the measurement unit 15 may be configured to detect a light level between the reception port 10 and the light SW unit 12 or between the reception unit 13 and the light SW unit 12. In this case, when the light level detected by the measurement unit 15 in the erroneous connection detection mode is greater than or equal to a predetermined value, it is determined that no erroneous connection has occurred. In this case, the reception unit 13 may have the functions of the measurement unit 15 to function as the measurement unit 15.

As described above, two cores provided at symmetric positions with respect to the line extending in a predetermined direction in a cross section of the MC optical fiber are used as the two cores used to perform transmission and reception between two communication devices that oppose each other. The line extending in a predetermined direction is determined based on the position of the locking mechanism of the connector of the MCI. With this configuration, even if a wrong type of MCI is used at any position, only the transmission ports and the reception ports of two communication devices that oppose each other are connected to each other, and it is therefore possible to prevent two unrelated communication devices that do not oppose each other from being connected to each other. Also, only the transmission ports and the reception ports of two communication devices that oppose each other are connected to each other, and it is therefore possible to easily solve the erroneous connection on the connection side of the SC optical fiber. Also, by providing the light SW unit in the communication device, the operator can remotely solve the erroneous connection without needing to visit the installation location of the communication device.

In FIGS. 3A and 3B, no core is provided on the line extending in a predetermined direction in a cross section of the MC optical fiber, or in other words, the line extending through the locking mechanism and the center of the MC optical fiber. However, there may be a case where an even number of cores are provided on the line extending in a predetermined direction. For example, when the arrangement of cores shown in FIGS. 3A and 3B is rotated by 45 degrees, two cores are present on the line extending in a predetermined direction. Furthermore, when cores are equidistantly arranged on two circumferences of different radiuses, four cores are present on the line extending in a predetermined direction. When cores are present on the line extending in a predetermined direction, an erroneous connection does not occur even if the first MCI and the second MCI are mistakenly used. Accordingly, in the present embodiment, as cores that are not present on the line extending in a predetermined direction, two cores that are line symmetric with respect to the line extending in a predetermined direction are used as a pair of cores used to perform transmission and reception between two communication devices that oppose each other. On the other hand, as an even number of cores that are present on the line extending in a predetermined direction, an arbitrarily selected pair of cores can be used to perform transmission and reception between two communication devices that oppose each other.

Figure 6A:
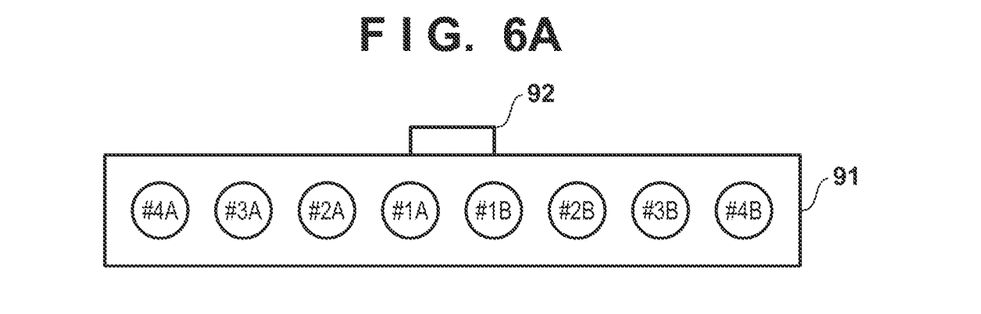
FIG. 6A is a cross-sectional view of a connector included in a first MCI according to an embodiment.
Figure 6B:
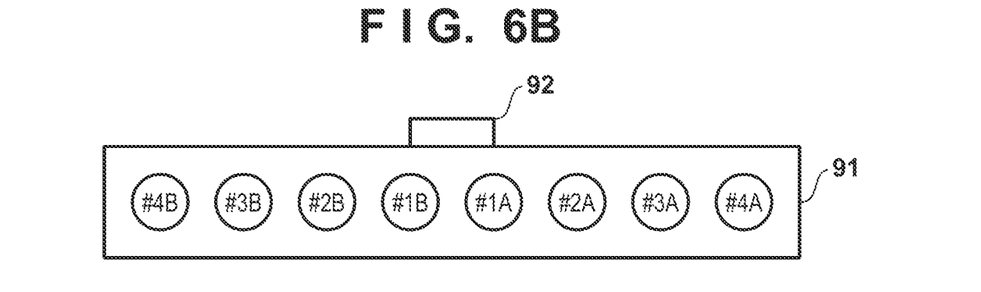
FIG. 6B is a cross-sectional view of a connector included in a second MCI according to the embodiment.

The present embodiment has been described by taking MC optical fibers each including four cores as an example, but it is sufficient that a plurality of cores are provided in a line symmetric manner, and the number of cores may be four or more. Furthermore, the present embodiment has been described by using MC optical fibers as optical fibers each including a plurality of cores. However, the present invention is also applicable to a so-called tape core wire obtained by bundling a plurality of SC optical fibers into the shape of a tape. FIGS. 6A and 6B show cross sections of a connector of a first MCI and a connector of a second MCI that are used in a tape core wire that includes eight SC optical fibers. Reference numeral 91 indicates a connector main body, and reference numeral 92 indicates a locking mechanism. In FIGS. 6A and 6B, two cores that are provided at symmetric positions with respect to a line extending through the center of the plurality of cores that are arranged in a line are paired as one pair, and the two cores included in the pair are used to perform transmission and reception between two communication devices that oppose each other. Specifically, core #1A and core #1B are paired as one pair, core #2A and core #2B are paired as one pair, core #3A and core #3B are paired as one pair, and core #4A and core #4B are paired as one pair.

Second Embodiment

Next, a second embodiment will be described focusing on differences from the first embodiment. In the first embodiment, the light SW unit 12, the monitoring unit 15, and the control unit 16 are provided in each communication device in order to solve an erroneous connection. In the present embodiment, an erroneous connection can be solved using only passive devices. In the present embodiment, with a repeater provided in an optical transmission line, two cores used to perform transmission and reception between two communication devices that oppose each other allow only optical signals that propagate in mutually different directions to pass therethrough. Specifically, in the case where connections are made as shown in FIGS. 4A and 4B, core #1A of the optical transmission line allows only an optical signal traveling from communication device #1 toward communication device #3 to pass therethrough, and blocks an optical signal traveling from communication device #3 toward communication device #1. Core #1B of the optical transmission line allows only an optical signal traveling from communication device #3 toward communication device #1 to pass therethrough, and blocks an optical signal traveling from communication device #1 toward communication device #3.

Figure 7:
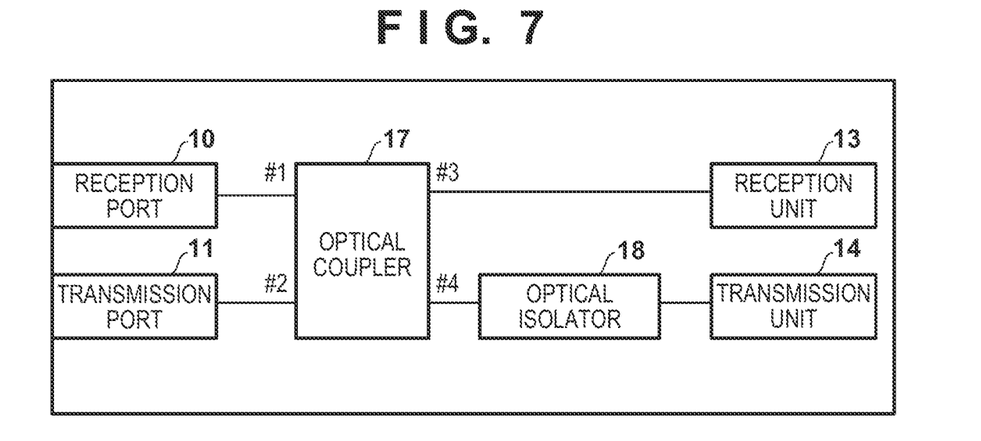
FIG. 7 is a configuration diagram of a communication device according to an embodiment.

FIG. 7 is a configuration diagram of a communication device that includes a recovery mechanism for recovering from an erroneous connection. In the present embodiment, an optical coupler 17 is used instead of the light SW unit 12 shown in FIG. 5. Also, an optical isolator 18 is provided between the transmission unit 14 and the optical coupler 17. The optical isolator 18 allows an optical signal traveling from the transmission unit 14 toward the optical coupler 17 to pass therethrough, but blocks an optical signal traveling from the optical coupler 17 toward the transmission unit 14.

An optical signal input to port #1 of the optical coupler 17 is split into two equal amplitude signals, which are then output from port #3 and port #4, respectively. An optical signal input to port #2 of the optical coupler 17 is split into two equal amplitude signals, which are then output from port #3 and port #4, respectively. An optical signal input to port #3 of the optical coupler 17 is split into two equal amplitude signals, which are then output from port #1 and port #2, respectively. An optical signal input to port #4 of the optical coupler 17 is split into two equal amplitude signals, which are then output from port #1 and port #2, respectively.

The optical signal transmitted by the transmission unit 14 is output from port #1 and port #2 of the optical coupler. Accordingly, the optical signal transmitted by the transmission unit 14 is output from both the reception port 10 and the transmission port 11. However, as described above, the optical signal output from the reception port 10 toward the optical transmission line is blocked by the optical transmission line, and only the optical signal output from the transmission port 11 is transmitted toward the opposing communication device. On the other hand, an optical signal transmitted by the opposing communication device is input to the reception port 10 or the transmission port 11 according to the type of MCI that connects the optical transmission line and the communication device. Irrespective of which of the reception port 10 and the transmission port 11 the optical signal output from the opposing communication device is input, the optical coupler 17 outputs the optical signal transmitted from the opposing communication device from port #3 and port #4. The optical signal output from port #3 is received by the reception unit 13. On the other hand, the optical signal output from port #4 is blocked by the optical isolator 18. As described above, if a wrong type of MCI is used, two communication devices that oppose each other can perform communication.

The present invention is not limited to the above embodiments, and various changes and modifications can be made within the spirit and scope of the present invention. Therefore, to apprise the public of the scope of the present invention, the following claims are made.

What is claimed is:

1. A communication device comprising:
a transmission unit configured to transmit a transmission optical signal;
a reception unit configured to receive a reception optical signal;
a transmission port connected to a first core;
a reception port connected to a second core;
an isolator connected to the transmission unit; and
an optical coupler connected to the isolator, the reception unit, the transmission port, and the reception port, wherein
the first core and the second core allow only optical signals that propagate in mutually different directions to pass therethrough
the isolator is configured to allow the transmission optical signal transmitted from the transmission unit to pass therethrough, but block an optical signal that travels toward the transmission unit, and
the optical coupler is configured to output the transmission optical signal transmitted from the transmission unit via the isolator to each of the transmission port and the reception port, output the reception optical signal transmitted from the reception port to each of the reception unit and the isolator, and output the reception optical signal transmitted from the transmission port to each of the reception unit and the isolator.

\* \* \* \* \*